S. S. &. C. R. JACKSON.
Nest for Fowls.
No. 168,838. Patented Oct. 19, 1875.
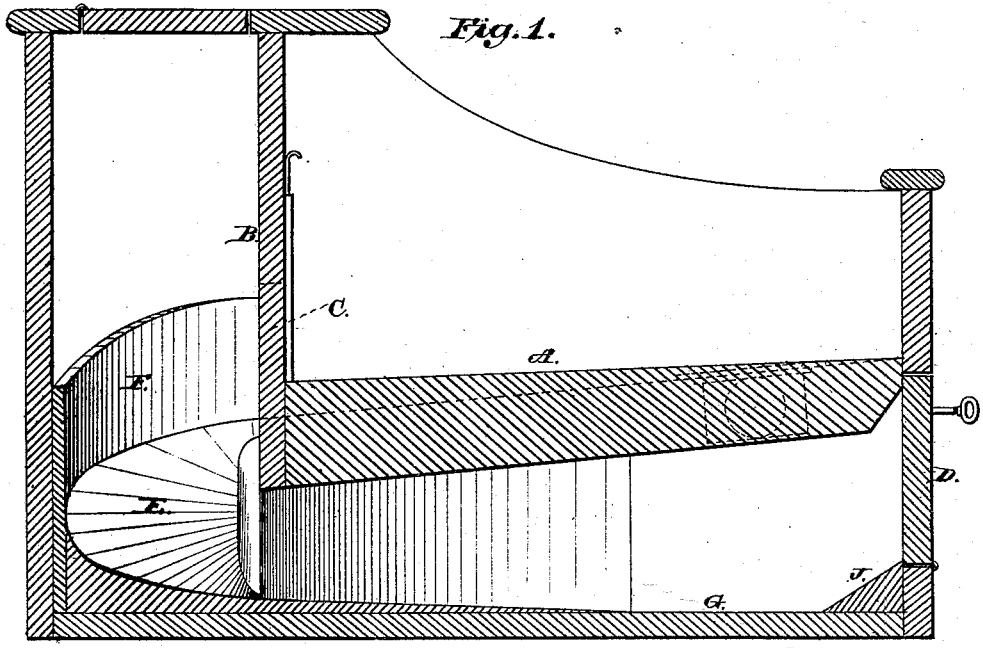
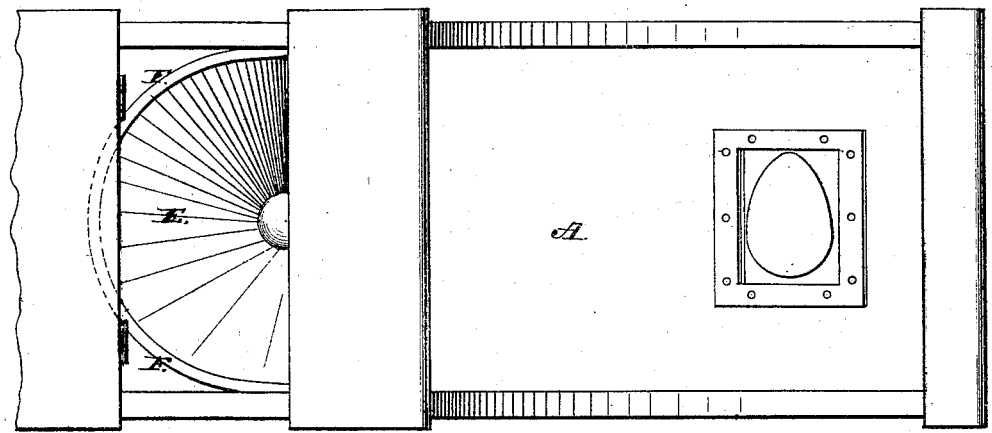

UNITED STATES PATENT OFFICE.

SAMUEL S. JACKSON, OF BLOOMFIELD, AND CHARLES R. JACKSON, OF NEWARK, NEW JERSEY.

IMPROVEMENT IN NESTS FOR FOWLS.

Specification forming part of Letters Patent No. 168,838, dated October 19, 1875; application filed April 30, 1875.

*To all whom it may concern:*

Be it known that we, SAMUEL S. JACKSON, of Bloomfield, and CHARLES R. JACKSON, of the city of Newark, in the county of Essex and State of New Jersey, have invented a new Nest for Fowls, which is fully set forth in the following specification, reference being had to the accompanying drawings.

Our nest is made in the usual form of a box, in which there is a partition forming a back to the nest, through which there is an aperture or door. The bottom of the nest is so inclined that an egg will roll down through the aperture out of the nest, over a circular inclined plane, to a level, (under the upper inclined plane,) where there is a reverse inclined plane to check the headway of the egg by its rolling up (the reverse inclined plane) a short distance and back to the level, where the egg stops. The object of the reverse inclined plane is to protect the shell of the egg from sudden contact with the side of the box.

Reference is had to drawings, (see diagrams.) Letter A, the inclined plane (on which the hen lays her egg) leading to the partition B, in which there is a door or aperture, C, through which the egg passes onto the circular inclined plane E, constructed with a fence, F F F, on either side, to guide the egg over and down the circular inclined plane to the level G, to the reverse inclined plane J. There is also a shutter in front, on the outside of the box, for the purpose of taking the eggs out of the box. There is also a nest-egg inserted in the bottom of the nest or inclined plane, covered with a glass. There is also a shutter on top of the box, for the purpose of inclosing or covering the circular inclined plane.

What we claim, and desire to secure by Letters Patent, is—

A nest for fowls, consisting of a box provided with an inclined false bottom, leading to an aperture through the partition in the rear portion of the box, and a curved inclined plane leading from the aperture in the partition to the receptacle under the false bottom, substantially as shown and described.

SAMUEL S. JACKSON.
CHAS. R. JACKSON.

Witnesses:
D. W. BRANT,
CYRUS E. VREELAND.